United States Patent [19]
Pellet et al.

[11] Patent Number: 4,734,185
[45] Date of Patent: * Mar. 29, 1988

[54] CRACKING PROCESS USING ZEOLITE AND SILICOALUMINOPHOSPHATE MOLECULAR SIEVE

[75] Inventors: Regis J. Pellet, Croton; Peter K. Coughlin, Yorktown Heights; Mark T. Staniulis, Peekskill; Gary N. Long, Putnam Valley; Jule Rabo, Armonk, all of N.Y.

[73] Assignee: Union Carbide Corporation, Danbury, Conn.

[*] Notice: The portion of the term of this patent subsequent to Apr. 23, 2002 has been disclaimed.

[21] Appl. No.: 772,858

[22] Filed: Sep. 5, 1985

Related U.S. Application Data

[60] Division of Ser. No. 675,283, Nov. 27, 1984, and a continuation-in-part of Ser. No. 772,616, Sep. 4, 1985, which is a division of Ser. No. 675,285, Nov. 27, 1984, which is a continuation-in-part of Ser. No. 490,952, May 2, 1983, Pat. No. 4,512,875.

[51] Int. Cl.$^4$ ............... C10G 11/04; C10G 11/05
[52] U.S. Cl. ............................ 208/114; 208/120
[58] Field of Search ............... 208/111, 114, 120

[56] References Cited

U.S. PATENT DOCUMENTS

| | | | |
|---|---|---|---|
| 3,240,697 | 3/1966 | Miale et al. | 208/120 |
| 4,234,549 | 11/1980 | Stanley et al. | 423/245 |
| 4,440,871 | 4/1984 | Lok et al. | 502/214 |
| 4,499,327 | 2/1985 | Kaiser | 585/640 |
| 4,512,875 | 4/1985 | Long et al. | 208/114 |

*Primary Examiner*—Olik Chaudhuri
*Attorney, Agent, or Firm*—Vincent J. Vasta, Jr.

[57] ABSTRACT

Cracking catalysts and their use in cracking processes are disclosed. The cracking catalyst are prepared using mixtures of catalytic cracking catalysts containing zeolitic aluminosilicates effective in catalytic cracking and selected silicoaluminophosphate molecular sieves of U.S. Pat. No. 4,440,871.

25 Claims, 1 Drawing Figure

FIG. 1

CRACKING PROCESS USING ZEOLITE AND SILICOALUMINOPHOSPHATE MOLECULAR SIEVE

This application is a division of prior U.S. application Ser. No. 675,283, filing date 11/27/84, and this application is a continuation-in-part application of U.S. Ser. No. 772,616, filed Sept. 4, 1985, which in turn is a divisional of prior U.S. Ser. No. 675,285, filed Nov. 27, 1984 and which is a a continuation-in-part of U.S. Ser. No. 490,952, filed May 2, 1983 now U.S. Pat. No. 4,512,875.

FIELD OF THE INVENTION

The present invention relates to cracking catalysts derived from mixtures of zeolitic aluminosilicates and a specific class the silicoaluminophosphate molecular sieves of U.S. Pat. No. 4,440,871. The novel catalyst mixtures are employed in cracking processes to provide product mixtures substantially more valuable than products obtained by use of zeolite based cracking catalysts.

BACKGROUND OF THE INVENTION

The prior art dealing with catalytic cracking catalysts has in large part evolved by the preparation of modified zeolites for use as components in cracking catalysts. The following patents are representative of the prior art dealing with zeolites and matrices.

The use of conversion catalysts formed from a zeolite dispersed in a siliceous matrix has been disclosed in U.S. Pat. No. 3,140,249 and U.S. Pat. No. 3,352,796.

The use of blended matrix components, e.g., a catalyst comprising a zeolite, an inorganic oxide matrix and inert fines, which may be alpha alumina, is disclosed in U.S. Pat. No. 3,312,615. Catalysts comprising an amorphous silica-alumina, separately added alumina and a zeolite are disclosed in U.S. Pat. No. 3,542,670 and catalyst comprising a zeolite, an amorphous hydrous alumina and alumina monohydrate are disclosed in U.S. Pat. No. 3,428,550.

It has been disclosed that the steam and thermal stability of Y zeolites can be improved by the use of zeolites having a low level of alkali metal content and a unit cell size less than about 24.45 Angstroms (See: U.S. Pat. Nos. 3,293,192 and Re. 28,629 (Reissue of U.S. Pat. No. 3,402,996)).

Further, it has been disclosed (U.S. Pat. No. 3,591,488) that the hydrogen or ammonium form of a zeolite may be treated with $H_2O$ at a temperature ranging from about 800° to about 1500° F., and then subsequently cation exchange the steam and water treated zeolite with cations which may be rare earth metal cations. U.S. Pat. No. 3,676,368 discloses a rare earth exchanged-hydrogen faujasite containing from 6 to 14 percent rare earth oxides. U.S. Pat. No. 3,957,623 discloses a rare earth exchanged zeolite having a total of 1 to 10 weight percent rare earth metal oxide. U.S. Pat. No. 3,607,043 discloses a process for preparing a zeolite having a rare earth content of 0.3 to 10 weight percent.

U.S. Pat. No. 4,036,739 discloses hydrothermally stable and ammonia stable Y zeolite in which a sodium Y zeolite is ion exchanged to partially exchange sodium ions for ammonium ions, followed by steam calcination and a further ion exchange with ammonium to reduce the final sodium oxide content to below 1 weight percent, followed by calcination of the reexchanged product, or according to U.S. Pat. No. 3,781,199, the second calcination may be conducted after the zeolite is admixed with a refractory oxide.

The products obtained by use of such aforementioned catalysts may not be the most desirable in all instances. Accordingly, catalysts and processes have been developed to modify the products of cracking processes. Several patents have disclosed the use of various additives as components in cracking catalysts to modify product distributions. U.S. Pat. No. 4,284,529 discloses the use of a catalyst additive comprising a zeolite having an alpha value not less than about 5 and having substantially no activity for cracking n-hexane. U.S. Pat. No. 4,239,654 discloses a catalyst composition comprising an ultrastable Y-type crystalline aluminosilicate zeolite, a catalytic inorganic oxide matrix and a small pore crystalline ZSM-type zeolite. U.S. Pat. No. 4,289,606 is similar to U.S. Pat. No. 4,239,654 in that a small pore crystalline ZSM-5 type zeolite is employed with an ultrastable Y-type crystalline aluminosilicate zeolite as the catalyst. U.S. Pat. Nos. 4,309,279 and 4,309,280 relate to the use of a zeolite additive to cracking processes wherein the zeolite is characterized by a Constraint Index of about 1 to 12 and a silica to alumina ratio greater than about 12. The above processes relate to the use of zeolite mixtures and are necessarily limited to zeolites.

U.S. Pat. No. 4,440,871 discloses a novel class of crystalline microporous silicoaluminophosphate molecular sieves. These silicoaluminophosphates are generally disclosed as being useful for various hydrocarbon conversion processes, including catalytic cracking processes. The use of the silicoaluminophosphates of U.S. Pat. No. 4,440,871 as components in conventional cracking catalysts for the conversion of crude oil feedstocks containing carbon-hydrogen fragmentation compounds is disclosed in copending U.S. Ser. No. 490,952, filed May 2, 1983. Although the above generally disclose the use of the silicoaluminophosphates in cracking processes such do not disclose the use of specific silicoaluminophosphates to provide improved product distribution, as hereinafter discussed.

The use of silicoaluminophosphate molecular sieves as cracking catalysts is disclosed in copending U.S. Ser. No. 675,279, filed concurrently herewith and commonly assigned.

The instant invention relates to the use of specific silicoaluminophosphate molecular sieves as components in cracking catalysts and to catalytic cracking processes. When such silicoaluminophosphate molecular sieves are added to cracking catalysts and employed in catalytic cracking processes such processes give products having product distributions substantially different and more valuable from that obtained in the absence of such silicoaluminophosphate molecular sieves.

SUMMARY OF THE INVENTION

The instant process relates to the catalytic cracking of crude oil feedstocks to produce lower boiling hydrocarbons and comprises contacting said feedstocks at effective catalytic cracking conditions with a catalyst comprising particles having catalytic activity for cracking crude oil feedstocks, e.g., at least one zeolitic aluminosilicate of the type generally employed in cracking ctalysts, and at least one silicoaluminophosphate molecular sieve of U.S. Pat. No. 4,440,871 characterized in its calcined form by an adsorption of isobutane of at least 2 percent by weight at a partial pressure of 500 torr and a temperature of 20° C. The zeolitic aluminosilicate is characterized as being a zeolitic cracking component, such as heretofore traditionally employed in such cracking catalysts, e.g., the various forms of zeolite Y. The silicoaluminophosphate molecular sieves employed in this invention are unique in that such are not zeolitic aluminosilicates, as heretofore employed in the prior art, but are members of the class of novel silicoaluminophosphate molecular sieves of U.S. Pat. No. 4,440,871.

DETAILED DESCRIPTION OF THE INVENTION

The present invention relates to new catalytic cracking catalysts, the process for their preparation and to the process of their use in catalytic cracking processes for the conversion of crude oil feedstocks. The catalytic cracking catalysts of the instant invention are derived from a special class of a novel class of silicoaluminophosphate molecular sieves and any suitable cracking catalyst known in the art to have cracking activity at effective catalytic cracking conditions. The silicoaluminophosphates employed in the instant invention are a special class of the silicoaluminophosphates denominated as "SAPOs" in U.S. Pat. No. 4,440,871, incorporated herein by reference thereto. These microporous crystalline silicoaluminophosphates have pores which are uniform and have nominal diameters of greater than about 3 Angstroms and whose essential empirical chemical composition in the as-synthesized and anhydrous form is $mR:(Si_xAl_yP_z)O_2$ wherein "R" represents at least one organic templating agent present in the intracrystalline pore system; "m" has a value of from 0.02 to 0.3; "m" represents the moles of "R" present per mole of $(Si_xAl_yP_z)O_2$; "x", "y" and "z" represent the mole fractions of silicon, aluminum and phosphorus, respectively, present as tetrahedral oxides, said mole fractions being such that they are within the pentagonal compositional area defined by points A,B,C,D and E of the ternary diagram which is FIG. 1 wherein said points have the following values

Figure 1:
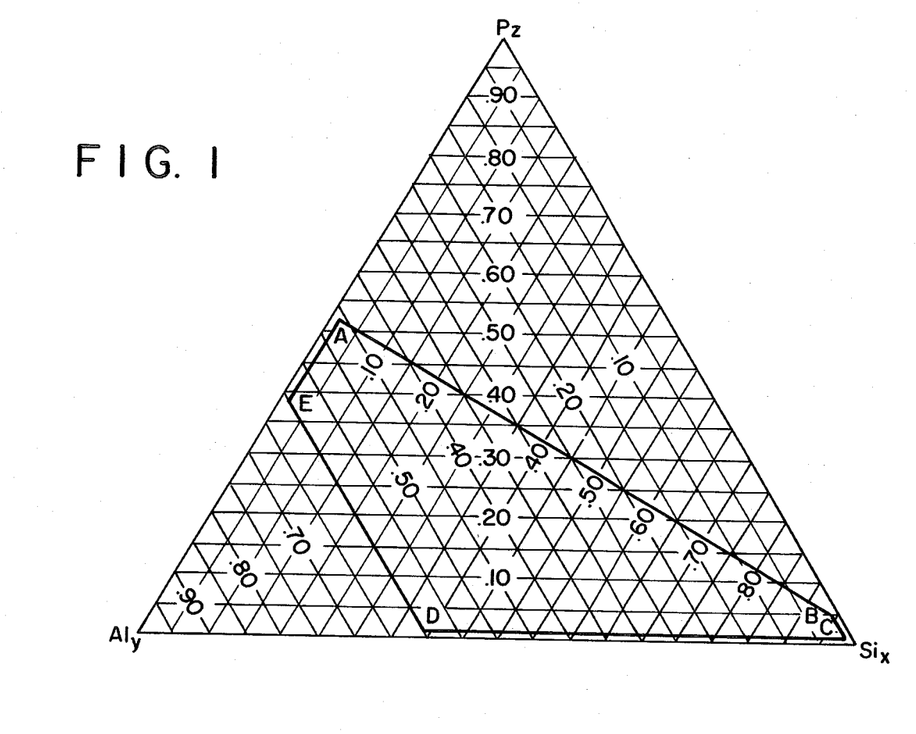
FIG. 1 is a ternary diagram showing the compositional parameters of the silicoaluminophosphates of U.S. Pat. No. 4,440,871 in terms of the mole fractions of silicon, aluminum and phosphorus.

| Point | Mole Fraction | | |
|---|---|---|---|
| | x | y | z |
| A | 0.01 | 0.47 | 0.52 |
| B | 0.94 | 0.01 | 0.05 |
| C | 0.98 | 0.01 | 0.01 |
| D | 0.39 | 0.60 | 0.01 |
| E | 0.01 | 0.60 | 0.39 |

It has been found that the use of specific silicoaluminophosphates provide an improved distribution of products when such silicoaluminophosphates are employed in conjunction with conventional zeolitic aluminosilicate cracking catalysts. Heretofore, the catalysts of the prior art have required that certain penalties be endured for the optimization of a particular process variables or product characteristic, e.g., octane. For example, an improvement in gasoline octane of the products as indicated by an increased ratio of branched to linear olefins and isoparaffin to normal paraffins has been observed to occur with a concurrent decrease in gasoline yield and in feed conversion when zeolite aluminosilicate based catalysts are employed. As aforementioned, the presence of isoparaffins and branched olefins have long been employed as indications of higher octane products and their increase or decrease used as a relative indication of the octane of the gasoline product. The instant process is characterized by improved production of isoparaffins and branched olefins and also by a decrease in the relative amount of normal paraffins and linear olefins while minimizing the loss in gasoline yield and feed conversion.

The silicoaluminophosphate molecular sieves of U.S. Pat. No. 4,440,871 are described as microporous crystalline silicoaluminophosphates the pores of which are uniform and have nominal diameters of greater than about 3 Angstroms and whose essential empirical chemical composition in the as-synthesized and anhydrous form is $mR:(Si_xAl_yP_z)O_2$ wherein "R" represents at least one organic templating agent present in the intracrystalline pore system; "m" represents the moles of "R" present per mole of $(Si_xAl_yP_z)O_2$; "m" has a value of from 0.02 to 0.3; "x", "y" and "z" represent the mole fractions of silicon, aluminum and phosphorus respectively, present as tetrahedral oxides, said mole fractions being such that they are within the pentagonal compositional area defined by points ABCD and E of the ternary diagram which is FIG. 1 of the drawings of U.S. Pat. No. 4,440,871. The SAPO molecular sieves of U.S. Pat. No. 4,440,871 are also described as silicoaluminophosphates having a three-dimensional microporous framework structure of $PO_2^+$, $AlO_2^-$ and $SiO_2$ tetrahedral units, and whose essential empirical chemical composition on an anhydrous basis is:

$mR:(Si_xAl_yP_z)O_2$ wherein "R" represents at least one organic templating agent present in the intracrystalline pore system; "m" represents the moles of "R" present per mole of $(Si_xAl_yP_z)O_2$ and has a value of from zero to 0.3; "x", "y" and "z" represent respectively, the mole fractions of silicon, aluminum and phosphorus present in the oxide moiety, said mole fractions being within the compositional area bounded by points A, B, C, D and E on the ternary diagram which is FIG. 1, said silicoaluminuophosphate having a characteristic X-ray powder diffraction pattern which contains at least the d-spacings set forth below in any one of Tables I, III, V, VII, IX, XII, XVII, XXI, XXIII or XXV of U.S. Pat. No. 4,440,871. Further, such crystalline silicoaluminophosphates may be calcined at a temperature sufficiently high to remove at least some of any organic templating agent present in the intracrystalline pore system. The silicoaluminophosphates of U.S. Pat. No. 4,440,871 are generally referred to therein as "SAPO-n", as a class, or as "SAPO-n" wherein "n" is an interger denoting a particular SAPO as its preparation is reported in U.S. Pat. No. 4,440,871. The specific SAPOs employed in the instant invention are further characterized in their calcined form by an adsorption of isobutane of at least 2 percent by weight at a partial pressure of 500 torr and a temperature of 20° C. Further, and more preferably such SAPOs are also characterized in their calcined form by an adsorption of triethylamine of less than 5 percent by weight at a partial pressure of 2.6 torr and a temperaure of 22° C. SAPO's employable herein include, but are not limited to, SAPO-5, SAPO-11, SAPO-31, SAPO-37, SAPO-40 and SAPO-41.

The above characterization of the silicoaluminophosphates (SAPOs) employed in the instant invention relates to an adsorption characterization that is carried out on a SAPO which has been subjected to a post synthesis treatment, e.g., calcination or chemical treatment, to remove a substantial portion of the template "R" which is present as a result of synthesis. Although a particular SAPO is characterized herein by its adsorption of isobutane and optionally lack of adsorption of that of triethylamine as being a SAPO in its calcined form, the instant invention necessarily includes the use of a non-calcined SAPO which is characterized by such adsorption in its calcined form, since upon use of such a non-calcined SAPO in the instant process at catalytic cracking conditions the SAPO will be calcined or hydrothermally treated in situ so as to have the characteristic minimum adsorption of isobutane. Thus, the SAPO will be rendered in situ to a form characterized by the aforementioned adsorption characteristics. For example, an as-synthesized SAPO-11 is not characterized by the aforementioned adsorption of isobutane due to the presence of template "R" which is present as a result of synthesis, although the calcined form of SAPO-11 is characterized by the aforementioned adsorption of isobutane or triethylamine. Thus, reference to a SAPO as having a particular adsorption characteristic in its calcined form is not intended to exclude the use of the SAPO in its as-synthesized form which upon calcination, hydrothermal treatment and/or other treatment, e.g., ion exchange with suitable cations, would have such adsorption characteristics.

It has been found that this class of silicoaluminophosphates provides product distributions not formed by cracking catalysts containing zeolitic aluminosilicates without a silicoaluminophosphate. Heretofore, the catalysts of the prior art have exhibited a decrease in gasoline yield and/or conversion for the optimization of a particular process variable or product characteristic e.g., octane of the gasoline product. Such penalties are reduced by use of the instant catalysts. Further, improved production of isoparaffins and branched olefins and also by the decreased amount of normal paraffins and linear olefins by use of the instant catalysts are indications of higher octane products.

The term "crude oil feedstock" is used herein to denominate any crude oil feedstock or portion thereof and includes full range crude oils from primary, secondary or tertiary recovery from conventional or offshore oil fields and feedstocks derived therefrom. "Crude oil feedstocks" may also by "syncrudes" such as those that can be derived from coal, shale oil, tar sands and bitumens. The crude oil feedstock may be virgin (straight run) or generated synthetically by blending. Such crude oil feedstocks are traditionally desalted prior to use since sodium chloride is known to be a poison in many cracking operations. Further, the term "crude oil feedstocks" is intended to include component parts of crude oils which have heretofore been generally employed as catalytic cracking feeds or potential feeds and includes feeds such as distillate gas oils, heavy vacuum gas oils, VGO, atmospheric and vacuum resids, syncrudes, pulverized coal and fractions boiling above the traditional end of the gasoline boiling range which generally includes compounds containing greater than about eleven carbon atoms and combinations thereof.

Cracking catalysts are in particulate form and generally comprise an inorganic, porous refractory oxide such as silica-alumina and also alumina and/or silica and/or clays. Such catalysts also generally contain at least one aluminosilicate. The zeolitic aluminosilicate cracking component of such catalysts may be any aluminosilicate heretofore employed as a component in cracking catalysts. Representative of the zeolitic aluminosilicates disclosed heretofore as employable as component parts of cracking catalysts are Zeolite Y, Zeolite X, Zeolite beta (U.S. Pat. No. 3,308,069), Zeolite KZ-20 (U.S. Pat. No. 3,445,727), Zeolite ZSM-3 (U.S. Pat. No. 3,415,736), faujasite, LZ-10 (U.K. Pat. No. 2,014,970, June 9, 1982), ZSM-type zeolites and mixtures thereof. Traditional cracking catalysts containing amounts of $Na_2O$ less than about 6 percent by weight are generally preferred with less than 1 percent by weight $Na_2O$ being generally employed in traditional cracking catalysts, based on the total catalyst weight.

Representative Y-type zeolites believed employable herein include, but are not limited to, those disclosed in U.S. Pat. Nos.: 3,130,007; 3,835,032; 3,830,725; 3,293,192; 3,449,070; 3,839,539; 3,867,310; 3,929,620; 3,929,621; 3,933,983; 4,058,484; 4,085,069; 4,175,059; 4,192,778; 3,676,368; 3,595,611; 3,594,331; 3,536,521; 3,293,192; 3,966,643; 3,966,882 and 3,957,623.

Another zeolitic aluminosilicate employable herein is "LZ-210", as described in E.P.C. Publication No. 82,211 published June 29, 1983.

The term "ZSM-type" zeolites is generally employed in the art to refer to those zeolites denominated by the nomenclature "ZSM-n" where "n" is an integer. The ZSM-type aluminosilicates include but are not limited to ZSM-5, ZSM-11, ZSM-12, ZSM-23, ZSM-35, ZSM-38, ZSM-48; and other similar materials.

ZSM-5 is described in greater detail in U.S. Pat. No. 3,702,886 and Re 29,948. The entire descriptions contained within those patents, particularly the X-ray diffraction pattern of therein disclosed ZSM-5, are incorporated herein by reference.

ZSM-11 is described in U.S. Pat. No. 3,709,979. That description, and in particular the X-ray diffraction pattern of said ZSM-11, is incorporated herein by reference.

ZSM-12 is described in U.S. Pat. No. 3,832,449. That description, and in particular the X-ray diffraction pattern disclosed therein, is incorporated herein by reference.

ZSM-23 is described in U.S. Pat. No. 4,076,842. The entire content thereof, particularly the specification of the X-ray diffraction pattern of the disclosed zeolite, is incorporated herein by reference.

ZSM-35 is described in U.S. Pat. No. 4,016,245. The description of that zeolite, and particularly the X-ray diffraction pattern thereof, is incorporated herein by reference.

ZSM-38 is more particularly describing U.S. Pat. No. 4,046,859. The description of that zeolite, and particularly the specified X-ray diffraction pattern hereof, is incorporated herein by reference.

ZSM-48 is more particularly described in U.S. Pat. No. 4,423,021. The description of that zeolite, and particularly the specified X-ray diffraction pattern thereof, is incorporated herein by reference.

CRACKING CATALYSTS

The catalysts of the instant invention comprise at least one zeolitic aluminosilicate cracking component and at least one SAPO molecular sieve component. The relative amount of each component will depend at least in part, on the selected crude oil feedstock and on the desired product distribution obtained therefrom but in instances an effective amount of at least one SAPO is employed to provide a different product distribution as compared to that obtained by use of the zeolitic aluminosilicate without the SAPO molecular sieve component. The relative weight ratio of the zeolitic aluminosilicate to the SAPO is generally between about 1:10 and about 500:1, desirably between about 1:10 and about 200:1, preferably between about 1:2 and about 50:1, and most preferably is between about 1:1 and about 20:1. The zeolitic aluminosilicate and/or SAPO may be ion-exchanged with a selected cation(s) and/or thermally treated either before or after mixture with each other or after such have been added separately or concurrently mixed with one or more inorganic oxide matrix components. When exchanged the SAPO molecular sieves are preferably exchanged with a hydrogen-forming cation species, e.g. $NH_4^+$, $H^+$, quaternary ammonium cations, etc. The SAPO preferably has at least part of its cations as hydrogen-forming cation species.

The term "thermal treatment" is employed here to denominate both a thermal calcination in the presence of air or inert gas, e.g., nitrogen, and a hydrothermal calcination (thermal calcination in the presence of steam). The thermal treatment is carried out at an effective temperature and time and when a hydrothermal treatment in the presence of an effective amount of steam. The thermal treatment is typically carried out at a temperature in excess of 300° C. for a period in excess of 0.25 hours and when the thermal treatment is a hydrothermal treatment it is typically carried out in the presence of at least about 20 percent steam by volume in air and up to about 100 percent steam. The source of the steam is not important and may be provided from an external source or may be generated in situ at the temperatures employed for the hydrothermal treatment. As aforementioned a SAPO may be employed in the instant process in its as-synthesized form since in situ hydrothermal treatment will be provided upon introduction of the SAPO to the process under catalytic cracking conditions.

Any ion-exchange of the zeolitic aluminosilicate(s) and SAPO(s), which aluminosilicate or SAPO may have been subjected to thermal treatment, may be carried out by contacting such with a solution of at least one cation, including those selected from the group of cations consisting of ammonium, Group IIA, Group IIIA, Group IIIB to VIIB and rare earth cations selected from the group consisting of cerium, lanthanum; praseodymium, neodymium, promethium, samarium, europium, gadolinium, terbium, dysprosium, holmium, erbium, thulium, ytterbium, lutetium and mixtures thereof. At present, the presence of rare earth cations with the SAPO molecular sieves has not been observed to be beneficial to the activity of the SAPO component. The exact nature of the relationship of rare earth cations and SAPOs is not clearly understood at present. As a result of ion-exchange the cation(s), e.g., rare earth cation, may replace at least a portion of the cations initially present in the zeolitic aluminosilicate or SAPO. The cations provided by ion-exchange may be present in an effective amount which may be between about 0.1 weight percent and about 20 weight percent, typically between about 0.5 and about 10 weight percent, based on the weight of the starting zeolitic aluminosilicate or SAPO.

The cracking catalysts of this invention are typically employed with an inorganic oxide matrix component which may be any of the inorganic oxide matrix components which have been employed heretofore in the formulation of FCC catalysts including: amorphous catalytic inorganic oxides, e.g., catalytically active silica-aluminas, clays, silicas, aluminas, silica-aluminas, silica-zirconias, silica-magnesias, alumina-borias, alumina-titanias and the like and mixtures thereof. The zeolite and SAPO may be mixed separately with the matrix component and then mixed or the zeolite and SAPO may be mixed and then formed with the matrix component.

The inorganic oxide matrix component may be in the form of a sol, hydrogen or gel and is typically an alumina, silica, clay and/or silica-alumina component such as employed a conventional silica-alumina cracking catalyst, several types and compositions of which are commercially available. The matrix component may itself provide a catalytic effect or it may be essentially inert. The matrix may act as a "binder" in some instances, although in some instances the final catalyst may be spray dried or formed without the need of a binder. These materials may be prepared as a cogel of silica and alumina or as alumina precipitated on a preformed and preaged hydrogel. The silica may be present as a component in the solids present in such gels, e.g. present in an amount between about 5 and about 40 weight percent and preferably between about 10 and about 30 weight percent. Silica may also be employed in the form of a cogel comprising about 75 weight percent silica and about 25 weight percent alumina or comprising about 87 weight percent silica and about 13 weight percent alumina. The inorganic oxide matrix component will typically be present in the catalyst in an amount between about 0 and about 99 weight percent, preferably between about 5 and about 95 weight percent, based on the total catalyst weight. It is also within the scope of the instant invention to employ other materials in addition to the zeolitic aluminosilicate, SAPO molecular sieve and inorganic oxide matrix components in the final cracking catalysts, including various other types of zeolites, clays, carbon monoxide oxidation promoters, etc.

Representative of matrix systems employable herein are disclosed in British Patent Specification No. 1,315,553, published May 2, 1973 and U.S. Pat. Nos. 3,446,727 and 4,086,187, such being incorporated herein by reference thereto.

As above mentioned, the catalysts of the present invention may be employed with a matrix component and this may be an alumina component. The alumina component may comprise discrete particles of various aluminas, e.g., pseudobeohmite. The alumina component may be in the form of discrete particles having a total surface area, as measured by the method Brunauer, Emmett and Teller (BET), greater than about 20 square meters per gram ($M^2/g$), preferably greater than 145 $M^2/g$, for example, from about 145 to about 300 $M^2/g$. The pore volume of the alumina component is typically be greater than 0.35 cc/g. The average particle size of the alumina particles is generally less than 10 microns and preferably less than 3 microns. The alumina may be employed alone as the matrix or composited with the other matrix components. The alumina component may be any alumina and has preferably been preformed and placed in a physical form such that its surface area and pore structure are stabilized so that when the alumina is added to an impure, inorganic gel containing considerable amounts of residual soluble salts, the salts will not alter the surface and pore characteristics measurably nor will they promote chemical attack on the preformed porous alumina which could undergo change. For example, the alumina may be any an alumina which has been formed by suitable chemical reaction, the slurry aged, filtered, dried, washed free of residual salt and then heated to reduce its volatile content to less then about 15 weight percent. Further, an alumina hydrosol or hydrogen or hydrous alumina slurry may be used in the catalyst preparation.

The inorganic oxide matrix components, e.g. aluminas, silicas, clays, etc., may be present in the final catalyst in an amount ranging between about 5 and about 99 weight percent, preferably between about 5 and about 95 weight percent and more preferably between about 10 and about 85 weight percent, based on the total catalyst weight.

Mixtures of the zeolitic aluminosilicate, SAPO molecular sieve and the inorganic matrix may be formed into the final form for the catalyst by standard catalyst forming techniques including spray-drying, pelleting, extrusion and other suitable conventional means. Such catalysts are typically prepared by spray drying, such procedures being well known to those skilled in the art of preparing catalytic cracking catalysts. Although the exact reason for such is not presently understood, the instant catalysts have been observed to provide different results in some instances when employed in cracking processes depending on whether the zeolitic aluminosilicate and SAPO are coincidentially or separately mixed with the matrix component.

Catalytic cracking catalysts may be prepared by any one of several conventional methods. One method of preparing such catalysts employing silica-alumina and porous alumina is to react sodium silicate with a solution of aluminum sulfate to form a silica/alumina hydrogel slurry which is then aged to give the desired pore properties, filtered to remove a considerable amount of the extraneous and undesired sodium and sulfate ions and then reslurried in water. The alumina may be prepared by reacting solutions of sodium aluminate and aluminum sulfate under suitable conditions, aging the slurry to give the desired pore properties of the alumina, filtering drying, reslurry in water to remove sodium and sulfate ions and drying to reduce volatile matter content to less than 15 weight percent. The alumina may then be slurried in water and blended in proper amounts, with a slurry of impure silica-alumina hydrogel. The zeolitic aluminosilicate and SAPO molecular sieve may then be added to this blend. A sufficient amount of each component is utilized to give the desired final composition. The resulting mixture is then filtered to remove a portion of the remaining extraneous soluble salts therefrom. The filtered mixture is then dried to produce dried solids. The dried solids are subsequently reslurried in water and washed substantially free of the undesired soluble salts. The catalyst is then dried to a residual water content of less than about 15 weight percent. The catcatalyst is typically recovered after calcination.

Catalytic cracking with the catalyst of the present invention can be conducted in any catalytic cracking process under effective catalytic cracking conditions. Suitable catalytic cracking conditions include a temperature ranging between about 400° F. and about 1600° F., preferably between about 700° F. and about 1600° F. and a pressure ranging from about subatmospheric to several atmospheres, typically from about atmospheric to about 100 psig. The process may be carried out in a fixed fluidized bed, moving bed, ebullating bed, slurry, transferline, riser reactor or fluidized bed operation. The catalyst of the present invention can be used to convert any of the conventional hydrocarbon feeds used in catalytic cracking, that is, it can be used to crack naphthas, gas oil and residual oils having a high content of metal contaminants. It is especially suited for cracking hydrocarbons boiling in the gas oil range, that is, hydrocarbon oils having an atmospheric pressure boiling point ranging from about 420° F. to about 1800° F. to naphthas to yield not only products having a lower boiling point than the initial feed and gasoline products having an improved octane member.

The mixture of a traditional cracking and a SAPO may be carried out in any manner which results in the coincident presence of such in contact with the crude oil feedstock under catalytic cracking conditions. For example, a catalyst may be employed containing both the traditional cracking catalyst and a SAPO in single catalyst particles or SAPO, with or without a matrix component, may be added as a discrete component to a traditional cracking catalyst. In one embodiment, a SAPO may be added to a cracking process as a make-up catalyst to replace the traditional cracking catalyst that has been lost through attrition.

The following examples were carried out to illustrate the instant invention and are not intended to be limiting thereof. The zeolite LZ-210 was prepared in each example according to the disclosure of E.P.C. Publication No. 82,211, published June 29, 1983. SAPO molecular sieves were prepared according to U.S. Pat. No. 4,440,871. The SAPO molecular sieves were calcined in air prior to use in the following examples. Calcination procedures for the removal of template are disclosed in U.S. Pat. No. 4,440,871. The catalysts prepared in the following examples were evaluated by a procedure substantially the same as D-3907. Accordingly, reference to ASTM test method D-3907, hereinafter is meant to generally refer to the procedure of the ASTM test method with the following four modifications. First, the end boiling point of the products identified as gasoline products was 431° F. Second, the nitrogen post stripping of the catalyst was at 30 milliliters/min for a period of 23 minutes to 27 minutes. Third, the conversion is the measured conversion and not the standardized conversion of the ASTM test method. Fourth, the feedstock employed in the test method had an API gravity of 24.0°, an IBP (Initial Boiling Point) of 354° F., FBP (Final Boiling Point) of 1077° F. and a UOP K Factor of 11.8.

Example 1

A cracking catalyst was prepared according to the invention employing a mixture of SAPO-5 and LZ-210. In addition, a cracking catalyst containing LZ-210 was prepared as a reference catalyst. The catalysts were prepared using LZ-210, having a $SiO_2/Al_2O_3$ ratio of 9.0, and SAPO-5. Two catalysts were prepared. Catalyst A was the reference catalyst and Catalyst B was a catalyst according to this invention. Catalyst A was prepared by slurrying 18% by weight LZ-210, 18% by weight of pseudoboehmite alumina, 60% by weight of a kaolin clay; 4% by weight of a silica and enough water to form a slurry having a 25% by weight solids content. The aforementioned percentages for the solid components are given on a dry basis. The slurry was then spray dried to obtain a fluidizable catalyst composite that would pass through a 150 micron sieve (U.S. Standard). The catalyst was then calcined at 600° C. for 1 hour and then steam deactivated at 740° C. for 2 hours in 100% steam. Catalyst B was prepared by mixing Catalyst A and SAPO-5. The SAPO-5 was steam deactivated at 760° C. for 2 hours in 100% steam prior to mixing with Catalyst A. The steam deactivation procedures are provided to simulate the environment experienced by commercial cracking catalyst. Catalyst B contained 10 percent by weight of SAPO-5 based on the total weight of Catalyst B.

Catalysts A and B were each evaluated according to ASTM test method D-3907. In this and in the subsequent examples the "wt.% Conversion" is the measured weight percent conversion as defined in ASTM test method D-3907 and as above discussed. The "Wt.% Gasoline" is defined as those hydrocarbons in the product from $C_5$ hydrocarbons to hydrocarbons boiling below 431° F. expressed as a weight percent of feed. The term "alkylate" herein denominates propylene, butylenes and isobutane. The "Wt.% Gas" is defined as those hydrocarbons boiling below $C_4$ in the product as a weight percent of feed. The "Wt.% Coke" is defined as the residue left on the used catalyst after post stripping and is given as a weight percent of the feed. The "Wt.% $C_4$'s" is defined as the weight percent of isobutane, n-butane and butylenes of the product. The "wt.% $C_6$–$C_8$ Aromatics" is defined herein as the weight percent of benzene, ethyl benzene, toluene and xylenes in the gasoline product. The results were as follows:

|  | Catalyst | |
| --- | --- | --- |
|  | Catalyst A | Catalyst B |
| Wt. % Conversion | 70.3 | 71.0 |
| Wt. % Gasoline | 50.0 | 49.3 |
| Wt. % Gasoline + Aklylate | 60.9 | 61.6 |
| Wt. % $C_6$–$C_8$ Aromatics | 14.6 | 15.4 |
| Wt. % Coke | 4.9 | 4.8 |
| Wt. % Gas | 6.2 | 6.7 |
| Wt. % $C_4$s | 9.1 | 10.2 |

The above data demonstrate that Catalyst B was comparable to Catalyst A as to Wt.% Conversion and Wt.% Gasoline while making more aromatic products which are useful in enhancing the octane of the gasoline products.

Example 2

Two catalysts were prepared wherein Catalyst C was a reference catalyst containing LZ-210 having a $SiO_2/Al_2O_3$ ratio of 9.0 and Catalyst D was a catalyst according to the invention and contained LZ-210 and SAPO-11. Catalyst C was prepared by preparing a slurry containing 15% by weight LZ-210, 18% by weight of a pseudoboehmite alumina, 60% by weight kaolin clay and 4% by weight silica in enough water to obtain a slurry having 25 percent by weight solids. The slurry was then spray dried to obtain a fluidizable catalyst having its size characterized by passing through a 150 micron sieve (U.S. Standard). The catalyst was calcined at 600° C. for 1 hour and then steam deactivated at 765° C. for 2 hours in 100% steam.

Catalyst D was prepared according to the procedure employed for Catalyst C, except that 10 percent by weight kaolin clay was replaced by 10 percent by weight of SAPO-11, i.e. 50% by weight kaolin clay was employed.

Catalyst C and Catalyst D were evaluated according to ASTM test method D-3907, except that the run temperature was 850° F. instead of the 900° F. suggested by ASTM test method D-3907. The results were as follows:

|  | Catalyst | |
| --- | --- | --- |
|  | Catalyst C | Catalyst D |
| Conversion: | 61.9 | 62.9 |
| Wt. % Gasoline: | 46.5 | 47.6 |
| Wt. % Gasoline + Alkylate | 55.3 | 56.7 |
| Wt. % Paraffin Analysis[1]: | | |
| Iso/normal $C_4$ | 4.8 | 5.7 |
| Iso/normal $C_6$ | 13.6 | 17.1 |
| Iso/normal $C_7$ | 15.6 | 16.8 |
| Iso/normal $C_8$ | 7.1 | 8.1 |
| Wt. % Gas Product Analysis[2]: | | |
| Olefin/Paraffin $C_3$ | 2.8 | 3.8 |
| Olefin/paraffin $C_4$ | 0.55 | 0.66 |
| Wt. % Coke | 4.1 | 4.0 |

[1] Iso paraffin to normal paraffin ratios of compounds having the indicated number of carbons.
[2] Olefin to paraffin ratio of compounds having the indicated number of carbons.

The above results demonstrate that the addition of SAPO-11 as a component of Catalyst D provided products having comparable Wt.% Gasoline and Wt.% Gasoline+Alkylate while also providing for an increase in the iso to normal ratio of the paraffin products, thus indicating higher octane products. The increase in the olefin content of the gas product, as indicated by the Gas Product Analysis, indicates a gas product having more useful and valuable olefin products.

Example 3

Two catalysts were prepared wherein Catalyst E was a reference catalyst containing LZ-210 ($SiO_2/Al_2O_3$ ratio of 9.0) and Catalyst F was a catalyst according to this invention containing LZ-210 and SAPO-5.

Catalyst E was prepared by forming a slurry of 15% by weight LZ-210, 18% by weight of a pseudoboehmite alumina, 63% by weight kaolin clay, 4% by weight silica and enough water to form a slurry containing 25 percent by weight solids. The slurry was then spray dried calcined and treated by the procedure employed for Catalyst C in example 2.

Catalyst F was prepared by forming a slurry of 15% by weight LZ-210, 10% by weight SAPO-5, 18% by weight of a pseudoboehmite alumina, 53% by weight kaolin clay, 4% by weight silica and enough water to form a slurry containing 25% by weight solids. The slurry was then spray dried, calcined and treated by the procedure employed for Catalyst C in example 2.

Catalyst E and Catalyst F were each evaluated according to ASTM test method D-3907. The results were as follows:

|  | Catalyst | |
| --- | --- | --- |
|  | Catalyst E | Catalyst F |
| Wt. % Conversion | 77.2 | 76.8 |
| Wt. % Gasoline + Alkylate | 63.8 | 60.3 |
| Wt. % $C_6$–$C_8$ Aromatics | 33.4 | 37.8 |
| Wt. % Coke | 7.7 | 7.9 |

|  | Catalyst | |
|---|---|---|
|  | Catalyst E | Catalyst F |
| Catalyst/Oil Ratio (Weight) | 5 | 3 |

The above data indicate that Catalyst F, according to this invention, was considerably more active than Catalyst E requiring only a Catalyst/Oil ratio of 3 to achieve a conversion comparable to Catalyst E employed at a Catalyst/Oil ratio of 5. This use of forty percent less catalyst to achieve comparable conversion demonstrates the surprising increase in activity of the catalyst comprising LZ-210 and SAPO-5. Further, Catalyst F formed products containing about 4.4 percent more $C_6$-$C_8$ aromatic products in the gasoline product with about a 3.5% reduction in the Wt.% Gasoline+Alkylate. The presence of increased amounts of aromatic products is an indication of higher octane products. Further, aromatic components are valuable as components in other chemical processes.

The above data also demonstrate that the order of mixing of the components in Catalyst F resulted in changes in the mixed catalyst, as compared to the mixed catalysts of Example 1. The addition of SAPO-5 to the slurry, instead of physically mixing SAPO-5 with a Y zeolite/matrix mixture resulted in a more active catalyst than above described in example 1 for Catalyst B. The exact reasons for this change in activity as a result of the mixing order is not clearly understood at this time.

Example 4

Two catalysts were prepared wherein Catalyst G was a reference catalyst containing ZSM-5 ($SiO_2$ to $Al_2O_3$ ratio of 30), as described in U.S. Pat. No. 4,239,654, and Catalyst H was a catalyst according to this invention containing SAPO-5.

A catalyst base was prepared by rare earth exchanging LZ-210 by use of a solution of a mixture of rare earth chlorides. The rare earth solution contained about 46.0% by weight, expressed on rare earth oxides, with the rare earth component comprising 60.0% lanthanum ($La_2O_3$), 21.5% neodymium ($Nd_2O_3$), 10.0% cerium ($CeO_2$), 7.5% praseodymium ($Pr_6O_{11}$) and about 1.0% other rare earths. The final rare earth exchanged LZ-210 had 9.9% by weight rare earth, measured as the oxide ($RE_2O_3$ where "RE" denotes rare earth cations). A mixture was formed by blending 14.3% by weight of the rare earth LZ-210, 80.7% of a silica-alumina (sold by Davison Division of W. R. Grace under the trademark MS13/110 and containing 86 wt. % $SiO_2$ and 13 wt. % $Al_2O_3$) and 5.0% by weight of a microcrystalline cellulose extrusion aid. This mixture was extruded, dried at 110° C. in air for 16 hours and then steam deactivated for 5 hours at 760° C. in 100% steam. The extrudates were then crushed and sized to 60 to 200 mesh (U.S. Standard).

Catalyst G and Catalyst H were prepared by mixing, respectively, 5 percent by weight of ZSM-5 and SAPO-5 with 95 percent by weight of the catalyst base, as above prepared. The two catalysts were evaluated according to ASTM test method D-3907. The results were as follows:

|  | Catalyst | |
|---|---|---|
|  | Catalyst G | Catalyst H |
| Wt. % Conversion: | 65.2 | 66.8 |
| Wt. % Gasoline: | 42.8 | 47.3 |
| Wt. % $C_6$-$C_8$ Aromatics in Gasoline: | 11.5 | 14.1 |
| Iso/Normal ($C_6$ Paraffin) | 7.3 | 11.2 |

The above data demonstrate the significant improvements in Wt.% Conversion, Wt.% Gasoline, Wt.% $C_6$-$C_8$ Aromatics in Gasoline and the iso to normal ratio (weight ratio) of $C_6$ paraffins when SAPO-5 is employed as a component of the cracking catalyst as compared to the use of ZSM-5.

Example 5

Two catalysts were prepared according to the procedure employed in example 2 for Catalyst C and Catalyst D, except that the steam deactivation temperatures were as set forth below in Table I. Catalysts derived from the non-steam deactivated precursor of Catalyst C by changing the steam deactivation temperature are denominated "Catalyst C-n" wherein "n" is an integer. Catalysts derived from the non-steam deactivated precursor of Catalyst D are similarly denominated. The catalysts were evaluated according to ASTM test method D-3907 and the following results obtained:

TABLE I

|  | Catalyst | | | | | | | |
|---|---|---|---|---|---|---|---|---|
|  | C | C-1 | C-2 | C-3 | D | D-1 | D-2 | D-3 |
| Steam Deactivation Temperature (°C.) | 765 | 690 | 715 | 740 | 765 | 690 | 715 | 740 |
| Wt. % Conversion:[1] | 61.9 | 74.5 | 72.1 | 67.8 | 62.9 | 70.5 | 70.7 | 66.4 |
| Wt. % Gasoline: | 46.5 | 52.2 | 52.5 | 50.2 | 47.6 | 51.0 | 51.3 | 49.5 |
| $C_3$ Olefin/$C_3$ Paraffin Ratio: | 2.84 | 1.47 | 1.96 | 2.10 | 3.79 | 1.70 | 2.08 | 2.54 |
| $C_4$ Olefin/$C_3$ Paraffin Ratio: | 0.55 | 0.30 | 0.38 | 0.42 | 0.66 | 0.33 | 0.40 | 0.47 |
| $C_6$ Ratios, Olefin/paraffin: | 0.257 | 0.075 | 0.107 | 0.152 | 0.265 | 0.119 | 0.099 | 0.170 |
| $C_6$ Branched/Linear[2] Olefin: | 0.64 | 0.88 | 1.11 | 0.49 | 0.92 | 0.87 | 0.96 | 0.81 |
| $C_6$ Iso/Normal[3] Paraffin: | 13.6 | 13.0 | 13.7 | 13.2 | 17.1 | 15.3 | 15.8 | 15.1 |

[1]Run Temperature was 850° F. instead the 900° F. of ASTM test method D-3907.
[2]$C_6$ Branched olefins measured were 2-methyl-2-pentene and 2-methyl-1-pentene. $C_6$ linear olefins measured were 1-hexene, trans-2-hexene, cis-2-hexene and trans-3-hexene.
[3]$C_6$ iso-paraffins measured were 2-methyl pentane, 3-methyl pentane and 2,2-dimethyl butane. $C_6$ normal paraffin measured was n-hexane.

The above data demonstrate that catalysts containing SAPOs retain their selective nature after hydrothermal treatment. The branched to linear olefin weight ratio and the iso to normal paraffin weight ratios were higher at comparable conversions and gasoline yield for the catalysts containing SAPO-11 as compared to catalysts containing no SAPO-11, thus indicating higher octane products. Thus, the advantages derived from use of SAPOs is not significantly affected by hydrothermal deactivation conditions.

Example 6

Two catalysts were prepared wherein reference Catalyst J contained a steam stabilized Y zeolite denominated as LZ-10 and a Catalyst K contained LZ-10 and SAPO-11. LZ-10 was prepared according to U.K. Pat. No. 2,014,970 and was then ammonium exchanged.

Catalyst J was prepared by preparing a mixture containing 18% by weight LZ-10, 62% by weight kaolin clay and 20% by weight silica in enough water to form an extrudable mass. This mixture had a paste consistency and was mulled, extruded and calcined at 500° C. for 16 hours in air. The extrudates were crushed and sized so as to pass through a 60 mesh screen (U.S. Standard) and not pass through a 200 mesh (U.S. Standard) screen.

Catalyst K was prepared as was Catalyst J, except that the initial mixture was 18% by weight LZ-10, 6% by weight SAPO-11, 56% by weight kaolin clay and 20% by weight silica.

The two catalysts were evaluated according to ASTM test method D-3907 except the run temperature was 866° F. All product ratios are given as weight ratios. The results were as follows:

| | Catalyst | |
|---|---|---|
| | Catalyst J | Catalyst K |
| Wt. % Conversion | 70.2 | 69.1 |
| Wt. % Gasoline | 50.7 | 50.1 |
| $C_3$ Olefin/$C_3$ paraffin | 1.76 | 1.86 |
| $C_4$ Olefin/$C_4$ paraffin | .402 | .382 |
| $C_4$ Iso/$C_4$ Normal paraffin | 4.12 | 4.64 |
| Wt. % Alkylate | 10.9 | 10.9 |
| $C_6$ olefin/$C_6$ paraffin | .154 | .166 |
| $C_6$ iso/$C_6$ normal paraffin[1] | 13.4 | 15.4 |
| $C_6$ Branched/$C_6$ Linear Olefin[1] | 1.18 | 1.67 |
| $C_7$ olefin/$C_7$ paraffin | .0769 | .086 |
| $C_7$ iso/$C_7$ normal paraffin[2] | 16.9 | 18.6 |
| $C_7$ Branched/$C_7$ Linear Olefin[2] | .739 | .799 |

[1]$C_6$ isoparaffins measured were 2-methyl pentane, 3-methyl pentane and 2,2 dimethyl butane. $C_6$ normal paraffin measured was n-hexane. $C_6$ branched olefins measured were 3-methyl-1-pentene, 4-methyl-1-pentene, 2-methyl-1-pentene, 2-methyl-2-pentene and trans-3-methyl-2-pentene. $C_6$ linear olefins measured were 1-hexene, trans-2-hexene, cis-2-hexene and trans-3-hexene.
[2]$C_7$ iso-paraffins measured were 3-methyl hexane, 2-methyl hexane and 2,4-dimethyl pentane. $C_7$ normal paraffin measured was n-heptane. $C_7$ branched olefins measured were determined by measuring all $C_7$ olefins and subtracting from that factor the $C_7$ linear olefins measured. $C_7$ linear olefins measured were 1-heptene, cis-2-heptene, trans-2-heptene, cis-3-heptene and trans-3-heptene.

The above data demonstrate that Catalyst K, according to this invention, provided at comparable activity and gasoline yield a gasoline product having higher iso/normal paraffin and branched/linear olefin ratios in the $C_6$ and $C_7$ hydrocarbons which are indicative of higher octane products and such were formed at comparable gasoline yield and conversion.

Comparative Example 7

Two catalysts were prepared wherein reference Catalyst L contained LZ-210 and comparative Catalyst M contained AlPO$_4$-5 and Catalyst L. AlPO$_4$-5 was prepared according to U.S. Pat. No. 4,310,440.

Catalyst L was prepared by forming a mixture of 15% by weight LZ-210 ($SiO_2$ to $Al_2O_3$ ratio of 9.0), 63% by weight kaolin clay, 18% by weight alumina and 4% by weight silica. The catalyst was extruded and treated similar to the catalysts of example 3 except that the steam deactivation was at 765° C.

Catalyst M was prepared by blending 10% by weight of a calcined AlPO$_4$-5 with 90% by weight of Catalyst L.

Catalyst L and Catalyst M were evaluated by ASTM test method D-3907 The olefin/paraffin and iso/normal ratios are given as weight ratios. The results were as follows:

| | Catalyst | |
|---|---|---|
| | Catalyst L | Catalyst M |
| Wt. % Conversion | 69.9 | 67.1 |
| Wt. % Gasoline | 50.8 | 48.6 |
| $C_3$ Olefin/Paraffin | 2.87 | 2.68 |
| $C_4$ Olefin/Paraffin | 0.59 | 0.57 |
| $C_4$ Iso/Normal Paraffin | 4.36 | 4.36 |

The above data demonstrate that AlPO$_4$-5, having a similar framework topology to SAPO-5 but lacking $SiO_2$ tetrahedral components, does not provide the benefits observed from the use of SAPO-5 in conjunction with a traditional cracking catalyst.

Comparative Example 8

Three catalysts (N, O and P) were prepared. Catalysts N and P are comparative catalysts and catalyst O is a catalyst prepared according to the instant invention. The catalysts were formed according to the procedure employed in example 1 except that Catalysts O and P employed 54 weight percent kaolin clay and the zeolite and SAPO components were as follows. Catalyst N contained 18 weight percent of an LZ-210 having a $SiO_2$ to $Al_2O_3$ ratio of 9.0. Catalyst O contained 18 weight percent of the LZ-210 employed in Catalyst N and 6 weight percent of SAPO-11. Catalyst P contained 18 weight percent of the LZ-210 employed in Catalyst N and 6 weight percent of SAPO-34.

Catalysts N, O and P were steam deactivated in 100 percent steam for 2 hours and at 740° C., 740° C. and 760° C., respectively, and evaluated according to ASTM test method D-3907. The results of this evaluation were as follows:

| | Catalyst | | |
|---|---|---|---|
| | Catalyst N | Catalyst O | Catalyst P |
| Wt. % Conversion | 72.7 | 71.5 | 72.0 |
| Wt. % Gasoline | 52.7 | 51.2 | 47.7 |
| Wt. % Gas + $C_4$'s | 15.6 | 15.8 | 19.5 |
| Wt. % Coke | 4.05 | 4.27 | — |

The above results demonstrate the reduced gasoline yield of catalysts containing SAPO-34. SAPO-34 is not characterized by an adsorption of isobutane of at least 2 percent by weight at a pressure of 500 torr and a temperature of 20° C. as are the SAPOs of the instant invention.

Comparative Example 9

Two comparative catalysts were prepared for evaluation according to ASTM test method D-3907. The two catalysts were prepared using the silicoaluminophosphate molecular sieve SAPO-5 and the zeolite LZ-210 ($SiO_2$ to $Al_2O_3$ ratio of 9.0).

After preparation of SAPO-5 the material was steam deactivated in 100 percent steam at 760° C. for 2 hours to simulate the effect of actual use in a cracking process. The LZ-210 component was then rare earth exchanged with a mixture of rare earth chlorides, as described in example 4, to give a rare earth exchanged LZ-210 containing 9.9 weight percent rare earth, expressed as the oxide.

A matrix for the SAPO-5 and LZ-210 was prepared by mixing 90 percent by weight of a silica/alumina, sold by the Davison Division of W. R. Grace under the trade designation MS13/110, and 10 percent by weight of a microcrystalline cellulose extrusion aid. The mixture was extruded in the form of 1/16 inch pellets and dried in air at 110° C. for about 16 hours and then steam deactivated in 100 percent steam at 760° C. for 2 hours. The steam deactivated material was then crushed and sized to 60 to 200 mesh (U.S. Standard).

The SAPO-5 and LZ-210 catalysts were each prepared by mixing 15 percent by weight of the selected material with 85 percent by weight of the matrix. The LZ-210 was steam deactivated in 100% steam at 760° C. for 2 hours prior to use in the preparation of the catalyst. The final catalyst mixtures were then calcined at 590° C. in air for 3 hours. Each catalyst was evaluated for conversion according to ASTM test method D-3907. The results of the evaluation were as follows:

|  | Catalyst | |
| --- | --- | --- |
|  | SAPO-5 | LZ-210 |
| Wt. % Conversion | 57.7 | 57.2 |
| Wt. % Gasoline | 37.2 | 41.4 |
| Wt. % Gas | 6.6 | 5.5 |
| Wt. % Coke | 3.9 | 3.1 |
| Wt. % C$_4$ | 10.0 | 7.33 |

The above results demonstrate the individual activity of SAPO-5 and LZ-210 as cracking catalysts. Although LZ-210 showed a higher wt.% Gasoline SAPO-5 formed more gas products and C$_4$ products under the conditions of ASTM test method D-3907. As observable from the above examples according to the instant invention, the use of a catalyst comprising a traditional cracking catalyst and a SAPO provide products having different components than the products obtained by use of a SAPO or LZ-210 separately.

What is claimed is:

1. The process for cracking a crude oil feedstock to produce lower boiling hydrocarbons comprising contacting at effective catalytic cracking conditions at a temperature between about 400° F. and about 1300° F. a crude oil feedstock with a conversion catalyst comprising an effective cracking amount of at least one zeolitic aluminosilicate and an effective amount of at least one silicoaluminophosphate molecular sieve characterized in its calcined form by an adsorption of isobutane of at least 2 percent by weight at a partial pressure of 500 torr and a temperature of 20° C. wherein said silicoaluminophosphate is a microporous crystalline silicoaluminophosphates having pores which are uniform and having nominal diameters of greater than about 3 Angstroms and whose essential empirical chemical composition in the as-synthesized and anhydrous form is $$mR:(Si_xAl_yP_z)O_2$$

wherein "R" represents at least one organic templating agent present in the intracrystalline pore system; "m" has a value of from 0.02 to 0.3; "m" represents the moles of "R" present per mole of $(Si_xAl_yP_z)O_2$; "x", "y" and "z" represent the mole fractions of silicon, aluminum and phosphorus, respectively, present as tetrahedral oxides, said mole fractions being such that they are within the pentagonal compositional area defined by points A, B, C, D and E of the ternary diagram which is FIG. 1.

2. The process of claim 1 wherein said silicoaluminophosphate is further characterized in its calcined form by an adsorption of triethylamine of less than 5 percent by weight at a pressure of 2.6 torr and a temperature of 22° C.

3. The process of claim 1 wherein said catalyst comprises a weight ratio between about 1:10 and about 500:1 of said zeolitic aluminosilicate cracking component to said silicoaluminophosphate molecular sieve and from 0 and about 99 weight percent of at least one inorganic oxide matrix component, based on the total weight of said catalyst.

4. The process of claim 3 wherein the weight ratio of zeolitic aluminosilicate to said silicoaluminophosphate is between about 1:2 and about 50:1.

5. The process of claim 4 wherein the weight ratio of zeolitic aluminosilicate to said silicoaluminophosphate is between about 1:1 and about 20:1.

6. The process of claim 3 wherein inorganic oxide component is present in an amount between about 5 and about 95 percent by weight, based on the total weight of said catalyst.

7. The process according to claim 1 wherein said zeolite component of the conversion catalyst contains an effective amount of a cation selected from the group consisting of ammonium, Group IIA, Group IIIA, Groups IIIB to VIIB, cerium, lanthanum, praseodymium, neodymium, promethium, samarium, europium, gadolinium, terbium, dysprosium, holmium, erbium, thulium, ytterbium, lutetium and mixtures thereof.

8. The process of claim 1 wherein said silicoaluminophosphate has at least part of its cations as hydrogen-forming species.

9. The process of claim 8 wherein said hydrogen-forming species is NH$_4^+$ or H$^+$.

10. The cracking process of claim 1 wherein the process is carried out by contacting crude oil feedstock boiling between 420° F. and about 1800° F. with the conversion catalyst at a temperature between about 400° F. and about 1300° F., at a pressure between about 14.7 psia to about 100 psia.

11. The process of claim 7 wherein said conversion catalyst contains between about 0.1 percent and about 20 weight percent of said multivalent cations.

12. The process of claim 6 wherein said inorganic oxide matrix component is selected from the group consisting of clays, silicas, aluminas, silica-aluminas, silica-zirconias, silica-magnesia, alumina-borias, alumina-titanias and mixtures thereof.

13. The process of claim 1 wherein said silicoaluminophosphate is effective in increasing the octane of the hydrocarbon product.

14. The process of claim 3 wherein said zeolitic aluminosilicate is selected from the group consisting of zeolite Y, zeolite X, zeolite beta, zeolite KZ-20, faujasite, LZ-210, LZ-10, ZSM zeolites and mixtures thereof.

15. The process of claim 1 or 2 wherein said silicoaluminophosphate is at least one selected from the group consisting of SAPO-5, SAPO-11, SAPO-31, SAPO-37, SAPO-40 and SAPO-41.

16. The process of claim 15 wherein the silicoaluminophosphate is SAPO-5.

17. The process of claim 15 wherein the silicoaluminophosphate is SAPO-11.

18. The process of claim 15 wherein the silicoaluminophosphate is SAPO-31.

19. The process of claim 15 wherein the silicoaluminophosphate is SAPO-40.

20. The process of claim 15 wherein the silicoaluminophosphate is SAPO-41.

21. The process of claim 1 wherein said crude oil feedstock is selected from the group consisting of distillate gas oils, heavy vacuum gas oils, VGO, atmospheric resids, vacuum resids, syncrudes, and mixtures thereof.

22. The process of claim 1 wherein said zeolitic aluminosilicate is selected from the group consisting of zeolite Y, zeolite X, zeolite beta, zeolite KZ-20, faujasite, LZ-210, LZ-10, ZSM zeolites and mixtures thereof.

23. The process for cracking a crude oil feedstock to produce lower boiling hydrocarbon products comprising contacting at effective catalytic cracking conditions at a temperature between about 400° F. and about 1300° F. a crude oil feedstock with a conversion catalyst comprising effective cracking amounts of a Y zeolite effective in cracking a crude oil feedstock and at least one silicoaluminophosphate molecular sieve characterized in its calcined form by an adsorption of isobutane of at least 2 percent by weight at a partial pressure of 500 torr and a temperature of 20° C. wherein said silicoaluminophosphate is a microporous crystalline silicoaluminophosphates having pores which are uniform and having nominal diameters of greater than about 3 Angstroms and whose essential empirical chemical composition in the as-synthesized and anhydrous form is $$mR:(Si_xAl_yP_z)O_2$$

wherein "R" represents at least one organic templating agent present in the intracrystalline pore system; "m" has a value of from 0.02 to 0.3; "m" represents the moles of "R" present per mole of $(Si_xAl_yP_z)O_2$; "x", "y" and "z" represent the mole fractions of silicon, aluminum and phosphorus, respectively, present as tetrahedral oxides, said mole fractions being such that they are within the pentagonal compositional area defined by points A, B, C, D and E of the ternary diagram which is FIG. 1.

24. The process of claim 23 wherein said silicoaluminophosphate is effective in increasing the octane of the hydrocarbon product.

25. The process of claim 23 wherein said silicoaluminophosphate is SAPO-11.

* * * * *